US009334059B1

(12) United States Patent
Jones et al.

(10) Patent No.: US 9,334,059 B1
(45) Date of Patent: May 10, 2016

(54) ACOUSTIC PANEL LINER FOR AN ENGINE NACELLE

(71) Applicant: The United States of America as Represented by the Administrator of the National Aeronautics and Space Administration, Washington, DC (US)

(72) Inventors: Michael G. Jones, Newport News, VA (US); Douglas M. Nark, Norfolk, VA (US); Earl Ayle, Chandler, AZ (US); Fumitaka Ichihashi, Chandler, AZ (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/297,131

(22) Filed: Jun. 5, 2014

Related U.S. Application Data

(63) Continuation of application No. 61/831,328, filed on Jun. 5, 2013.

(51) Int. Cl.
*B64D 33/02* (2006.01)
*F02C 7/045* (2006.01)

(52) U.S. Cl.
CPC ........ *B64D 33/02* (2013.01); *B64D 2033/0206* (2013.01)

(58) Field of Classification Search
CPC  B64D 33/02; B64D 2033/0206; F02C 7/045; F02C 7/24; F02K 1/827; F05D 2250/283

USPC .................................................. 181/210, 292
See application file for complete search history.

(56) References Cited

U.S. PATENT DOCUMENTS

| 4,001,473 A | 1/1977 | Cook |
| 4,421,201 A | 12/1983 | Nelsen |

(Continued)

FOREIGN PATENT DOCUMENTS

| EP | 0824066 A1 | 2/1998 |
| EP | 1866489 B1 | 12/2007 |

(Continued)

OTHER PUBLICATIONS

PCT Search Report and Written Opinion for PCT/US2013/039458, dated Jun. 20, 2014.

(Continued)

*Primary Examiner* — Jeremy Luks
(74) *Attorney, Agent, or Firm* — Andrea Z. Warmbier

(57) ABSTRACT

An acoustic panel liner includes a face sheet, back plate, and liner core positioned therebetween, which may be used in an engine nacelle. Elongated chambers contain variable amounts of septa at a calibrated depth or depths. The septa may have varying DC flow resistance. The chambers may have a hexagonal or other polygonal cross sections. The septa, such as mesh caps, may be bonded to an inner wall of a corresponding chamber. The insertion depths may be the same or different. If different, the pattern of distribution of the depths may be randomized.

20 Claims, 3 Drawing Sheets

(56) References Cited

U.S. PATENT DOCUMENTS

| | | | |
|---|---|---|---|
| 5,594,216 A | * | 1/1997 | Yasukawa et al. ............ 181/213 |
| 7,434,659 B2 | | 10/2008 | Ayle |
| 7,510,052 B2 | | 3/2009 | Ayle |
| 7,854,298 B2 | | 12/2010 | Ayle |
| 8,066,098 B2 | | 11/2011 | Ayle |
| 8,413,761 B2 | | 4/2013 | Ayle |
| 8,579,076 B2 | | 11/2013 | Ayle et al. |
| 8,607,924 B2 | | 12/2013 | Ichihashi |
| 8,651,233 B2 | | 2/2014 | Ayle |
| 2006/0219477 A1 | | 10/2006 | Ayle |
| 2008/0020176 A1 | * | 1/2008 | Ayle ............................ 428/118 |
| 2014/0131136 A1 | | 5/2014 | AYLE |

FOREIGN PATENT DOCUMENTS

| | | | |
|---|---|---|---|
| EP | 2126898 B1 | | 12/2009 |
| WO | WO 2011/034469 A1 | | 3/2011 |
| WO | WO 2013/084135 A1 | | 6/2013 |
| WO | WO 2014/021963 A2 | | 2/2014 |

OTHER PUBLICATIONS

Wirt, L. S., "Analysis, Testing, and Design of Lined Ducts," The Journal of the Acoustical Society of America, 1972, pp. 1448-1463, vol. 51, No. 5 (Part 1).

Nark, Douglas M., et al., "Broadband Liner Optimization for the Source Diagnostic Test Fan," 18th AIAA/CEAS El Aeroacoustics Conference, Jun. 4-6, 2012, pp. 1-13, Colorado Springs, CO.

Jones, M. G., et al., "Evaluation of Parallel-Element, Variable-Impedance, Broadband Acoustic Liner Concepts," 18th AIAA/CEAS Aeroacoustics Conference, Jun. 4-6, 2012, pp. 1-17, Colorado Springs, CO.

Delany, M. E. et al., Acoustical properties of fibrous absorbent materials, Applied Acoustics 3, 1970, pp. 105-116.

Fahy, Frank, Foundations of Engineering Acoustics, 2000, Academic Press, p. 150.

Bies, David A. et al., Engineering Noise Control Theory and Practice, 2nd Edition, 1995, CRC Press, pp. 42-43.

* cited by examiner

ACOUSTIC PANEL LINER FOR AN ENGINE NACELLE

CROSS-REFERENCE TO RELATED APPLICATION

This application claims the benefit of U.S. Provisional Patent Application No. 61/831,328 filed on Jun. 5, 2013, which is hereby incorporated by reference in its entirety.

STATEMENT REGARDING FEDERALLY SPONSORED RESEARCH OR DEVELOPMENT

The invention described herein was made in part by employees of the United States Government, and may be manufactured and used by or for the Government for Government purposes without the payment of any royalties thereon or therefor.

TECHNICAL FIELD

The present disclosure relates to an acoustic panel liner, which may be used for an engine nacelle.

BACKGROUND OF THE INVENTION

Modern jet-powered aircraft have greatly expanded the affordability and practicality of long range commercial and personal transportation. However, the noise typically associated with jet engines continues to be identified as a significant constraint on the continued growth of transportation systems throughout the world. Aircraft noise is of particular concern given the proximity of airports to cities and other population centers. Therefore, the reduction of jet engine noise, as well as of noise generated by similar ground-based engines producing high-frequency turbine noise, is a desirable end goal for municipalities and manufacturers of such engines.

BRIEF SUMMARY OF THE INVENTION

An acoustic panel liner is disclosed herein. The acoustic panel liner can be used in an engine nacelle, e.g., of a jet-powered aircraft. Two primary sources of engine noise are addressed via the use of the acoustic panel liner described herein: intake fans or airfoils and center housing/engine core noise. The first and most common usage is to reduce the fan noise generated by rotation of the various intake fans of a jet engine, as well as the interaction of the resultant swirling airflow with stationary stators within an engine nacelle. The acoustic panel liners are constructed and positioned to absorb as much of this fan-related sound as possible before the sound can exit the engine nacelle to the surrounding atmosphere. The second source of engine noise is the engine core, which includes a compressor assembly, a combustor, and a turbine assembly. The presently disclosed acoustic panel liner may be of particular benefit when used to suppress compressor and/or turbine noise, as both noise sources tend to be tone-dominated, and are therefore at sufficiently high frequencies suitable for sound absorption.

In order to achieve a desired level of sound reduction, the acoustic panel liner described herein may include a multi-chambered liner core having a plurality of elongated, open-ended cells or "acoustic chambers." The elongated acoustic chambers may have the same or different amounts of septa embedded therein. Additionally, the amount of septa disposed within the elongated acoustic chambers can vary depending on the desired level of sound reduction (e.g. none, one, two, three, etc.). As used herein, the terms "septum" and its plural "septa" refer to any sheet of sound absorbing material, such as wire or composite mesh, that provides a calibrated DC flow resistance to airflow passing perpendicularly with respect to the plane of the septa, i.e., along a depth of a given elongated acoustic chamber in the present construction.

As used in the art and hereinafter, the term "DC" is analogous to the "direct current" of electrical arts, as distinguished from effects of fluctuating components of velocity, i.e., the pumping of air in and out of orifices of a sheet of material. The term "DC flow resistance" refers to the resistive drop across a sheet of septa material for a selected airflow velocity (u). That is, air is passed through a given material at the selected velocity (u), and the resultant drop in static pressure ($\Delta P$) across the material is measured. The DC flow resistance ($R_F$) is equal to the ratio of pressure drop to the velocity, i.e., $$R_F = \frac{\Delta P}{u}.$$

For common usage, the quoted DC flow resistance, including the various example DC flow resistances cited herein, are measured at a velocity of 105 cm/s.

The septa may be bonded to an internal surface of the elongated chambers. The insertion depths and/or the DC flow resistances of the various septa are varied, e.g., with random variation in the distribution pattern of the septa. In some embodiments, some of the septa may have a high DC flow resistance, with the term "high DC flow resistance" describing a DC flow resistance in excess of about 2000 MKS Rayls, which may include in excess of about 4000 MKS Rayls, or even in excess of about 40000 MKS Rayls. An MKS Rayl is a unit of specific acoustical impedance equal to a sound pressure of 1 pascal divided by a sound particle velocity of 1 m/s. The acoustic panel liner disclosed herein is therefore intended to provide improved sound absorption over a relatively broad frequency range relative to existing panel liners.

Because of the variable septa depths and/or variable septa resistances, together with the option of including very high resistance septa such that single-layer channels are closely approximated, the acoustic panel liner disclosed herein is able to absorb sound over a broader frequency range relative to existing designs. This allows targeting of the dominant tones noted above, plus absorption of additional broadband noise generated by the engine.

The acoustic panel liner in a possible embodiment includes a face sheet, a back plate, and a liner core positioned between the face sheet and the back plate. The liner core includes a plurality of elongated acoustic chambers each containing a septum embedded at a calibrated insertion depth. Each elongated acoustic chamber may have a polygonal cross-sectional shape, for instance a hexagon or a honeycomb structure, although other cross-sectional shaped may be envisioned.

The septa, which as noted above have a variation in at least one of the embedded depth and the DC flow resistance, may be embodied as mesh caps that are bonded to an inner wall of a corresponding one of the elongated acoustic chambers. More than one septa may be used in a given elongated acoustic chamber in an optional embodiment, with the number of layers (L) of a given elongated acoustic chamber being equal to the one more than the number of septa (S), i.e., L=S+1.

An engine assembly is also disclosed herein. The engine assembly includes an engine nacelle having a body, as well as an acoustic panel liner attached to the body. The acoustic panel liner includes a back plate, a face sheet, and a liner core positioned between the back plate and the face sheet. The back plate, which may be metal coated with a polymeric material in some configurations, is connected to a surface of the body. The liner core has elongated acoustic chambers each containing an embedded septum at a calibrated depth or at different insertion depths. The septa may have different DC flow resistances. In one embodiment, the septa may have a DC flow resistance of about 40 to about 1,200 MKS Rayls. In alternative embodiments, some of the septa of the liner core may have a high DC flow resistance, i.e., at least 2000 MKS Rayls, at least 4000 MKS Rayls, or at least 40000 MKS Rayls. Inclusion of the high DC flow resistance septa has the benefit of essentially shortening the elongated acoustic chamber for purposes of acoustic absorption. The pattern of distribution of the DC flow resistances and/or different depths within the elongated acoustic chambers may be randomized.

Another acoustic panel liner includes a face sheet, a back plate, and a liner core positioned between the face sheet and the back plate. In one embodiment, the face sheet can be perforated. The liner core in this instance has elongated hexagonal-shaped chambers each containing a mesh cap septum at a calibrated depth. A pattern of the insertion depths of the septa is randomized with the depths varied by at least 0.005", and the septa are provided with different DC flow resistances. For instance, 1.000" and 1.005" or more may be used as the depths, with the pattern of these depths randomized throughout the liner. Some of the mesh cap septa have a DC flow resistance of at least 4000 MKS Rayls, while one or more mesh cap septa have a DC flow resistance of less than 2000 MKS Rayls.

The above features and advantages and other features and advantages of the present invention are readily apparent from the following detailed description of the best modes for carrying out the invention when taken in connection with the accompanying drawings.

DETAILED DESCRIPTION OF THE INVENTION

Figure 1:
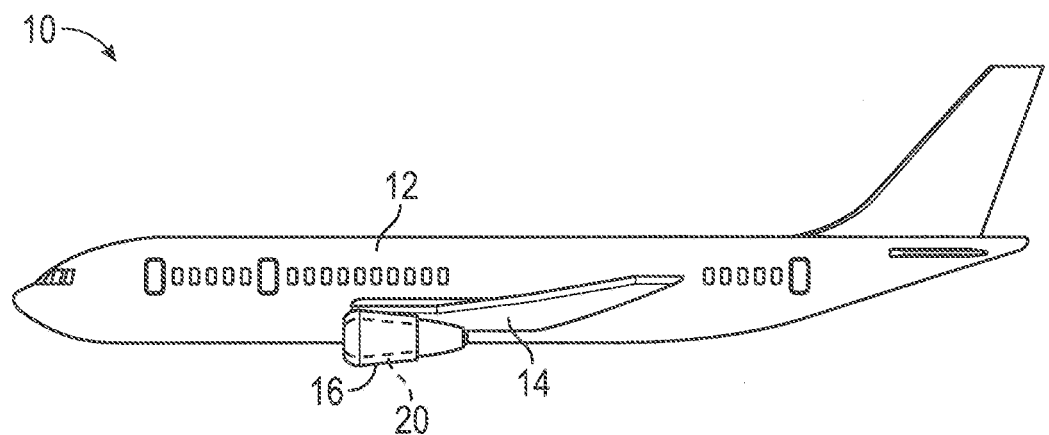
FIG. 1 is a schematic side view illustration of an example aircraft having an engine nacelle with an acoustic panel liner constructed as set forth herein.

Referring to the drawings, wherein like reference numbers refer to the same or similar components in the various Figures, a jet-powered aircraft 10 is shown in FIG. 1. The aircraft 10 includes a fuselage 12 and wings 14. While not visible from the perspective of FIG. 1, another identically configured wing 14 is disposed on the opposite side of the fuselage 12. Each wing 14 may include one or more engine assemblies 16, each of which may be lined with an acoustic panel liner 20 that is configured as described below with reference to FIGS. 2-4. While the aircraft 10 and its engine assembly 16 are described hereinafter for illustrative consistency as an example application for the acoustic panel liner 20, those of ordinary skill in the art will appreciate that the acoustic panel liner 20 may be used in various other applications in which noise reduction is a goal, whether in a different location aboard the aircraft 10 of FIG. 1 or in other applications such as stationary compressors and/or turbines, internal combustion engine housings, and the like.

Figure 2:
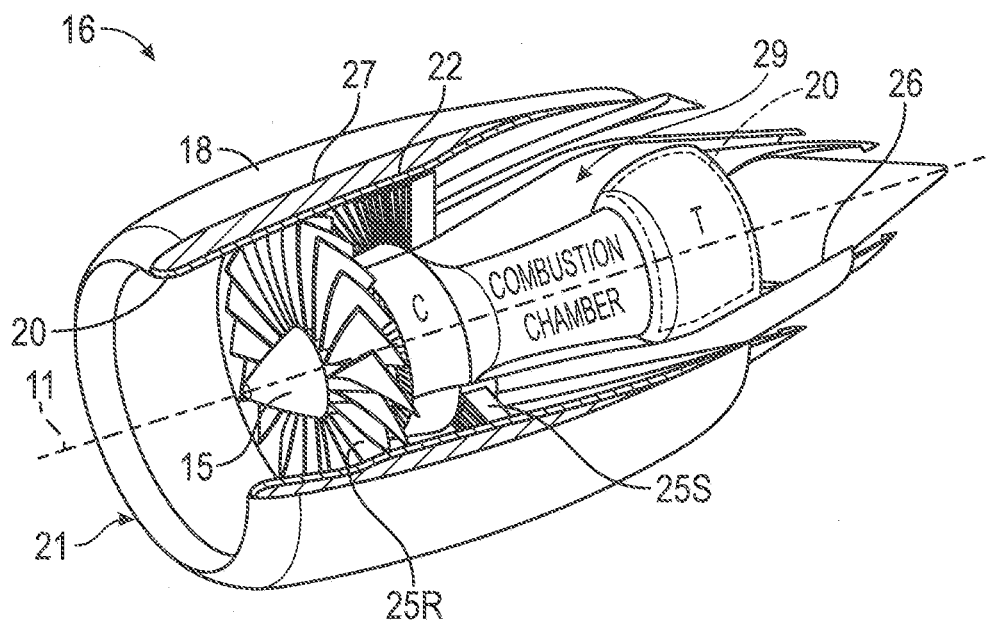
FIG. 2 is a schematic partial cross-sectional perspective view of the engine nacelle shown in FIG. 1.

Referring to FIG. 2, the engine assembly 16 is shown in a schematic partial cross-sectional perspective view to show internal detail, including the possible positioning of the acoustic panel liner 20. A typical jet engine has three major components all contained in a center body or engine core 29 along an axis of rotation 11: a compressor assembly (C) having low-pressure and high-pressure compressors, a turbine assembly (T) having high-pressure and low-pressure turbines, and a combustion chamber located between the compressor assembly (C) and the turbine assembly (T). Compression occurs from low-pressure to high-pressure, while depressurization occurs from high-pressure to low pressure occurs in the turbine assembly (T), as is known in the art. The compressor assembly (C), the combustion chamber, and the turbine assembly (T) are all surrounded by and enclosed within an engine nacelle 18 having a body 27.

Rotary airfoils 25R are disposed radially with respect to the axis of rotation 11 of a drive shaft 15, and a set of stationary airfoils 25S is arranged with respect to the same axis of rotation 11. Intake air (arrow 21) is drawn through the rotary airfoils 25R, and a portion flows into the compressor (C) where it is compressed and heated as the air passes into the combustion chamber. Once the compressed air reaches the combustion chamber, jet fuel is injected and ignited via a combustor (not shown). The rapidly expanding exhaust gas exerts force on a set of turbine blades (not shown) located within the turbine assembly (T). The turbine blades are connected to the drive shaft 15, a portion of which is shown in FIG. 2, and thus rotate with respect to the axis of rotation 11 as hot exhaust is expelled from a nozzle 26 to the surrounding atmosphere. The rotation of the turbine blades in turn spins the rotary airfoils 25R, which draws more intake air (arrow 21) into the combustion chamber in a continuing cycle.

Rotation of the rotary airfoils 25R and subsequent interaction of the swirling airflow with the stationary airfoils 25S produces high-frequency engine noise of the type which may be reduced using the acoustic panel liner 20 described herein. Similarly, noise produced by the core components, i.e., compressor (C), the combustor, and the turbine assembly (T), may be reduced by application of acoustic panel liner 20 on the interior surface of the turbine assembly (T) portion of the engine core 29. High noise levels are especially prevalent during takeoff when the aircraft 10 of FIG. 1 is at or near ground level. High throttle maneuvers typical of takeoff, for instance, can produce noise levels that reach as much as 150 dB.

The acoustic panel liner 20 of the present invention can therefore be used to line the surface 22 of the body 27 of the engine nacelle 18 and/or the turbine assembly (T) portion of the engine core 29 and thereby surround any high-frequency noise-producing components of the engine assembly 16. The acoustic panel liner 20 can also be placed in various other locations as needed to reduce noise, e.g., on the core housing with the face sheet facing the bypass duct flow, which points toward the surface 22 as is known in the art. In this embodiment, the acoustic panel liner 20, which may range from 1" to 3" in its overall thickness in a typical embodiment, may be used to reduce engine noise levels, particularly fan-related noise.

Figure 3:
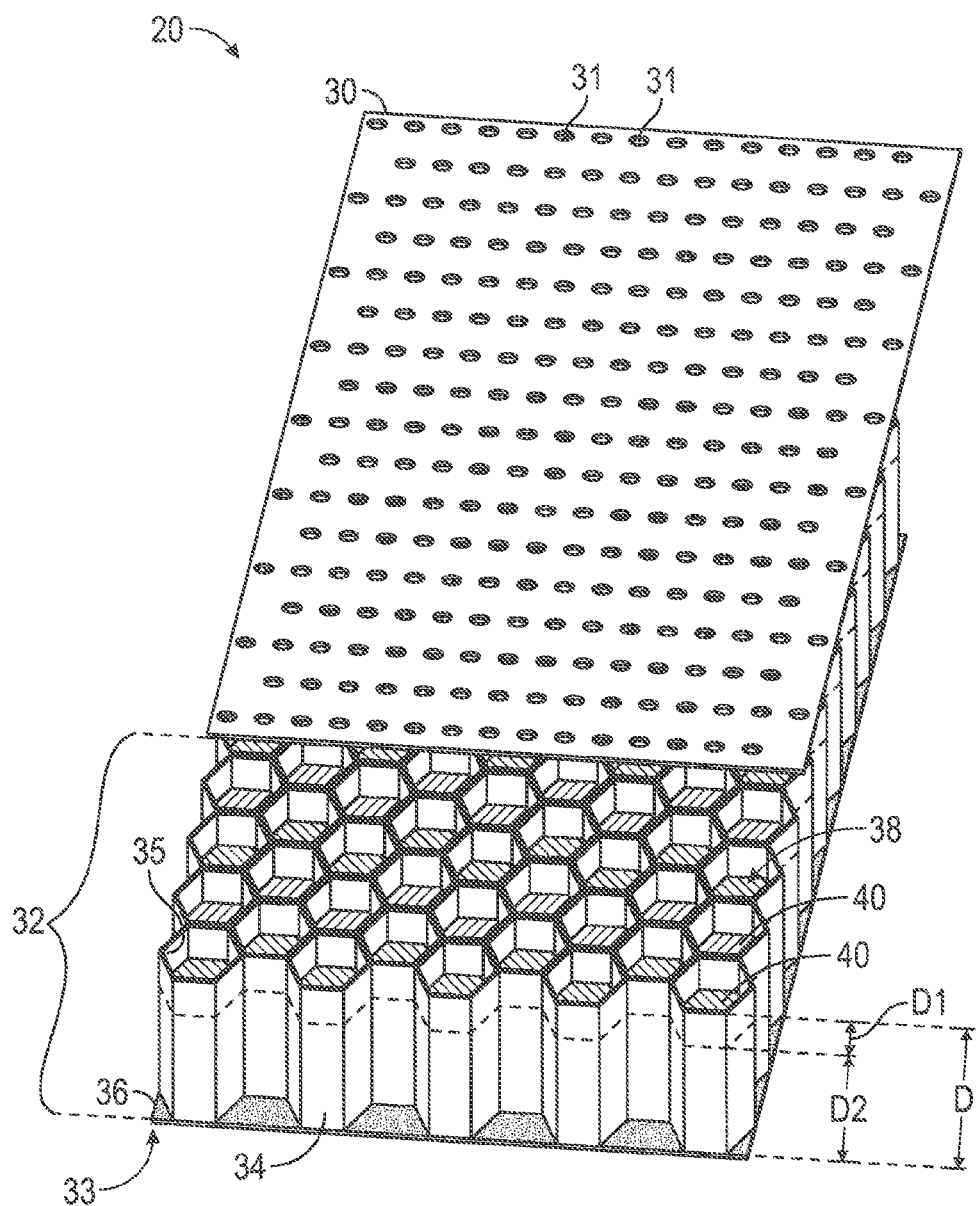
FIG. 3 is a schematic perspective partially-exploded view of an embodiment of an acoustic panel liner.

Referring to FIG. 3, an embodiment of the acoustic panel liner 20 includes a liner core 32 that is positioned between a face sheet 30, which may be perforated, and a back plate 33, both of which may be constructed of a lightweight material such as aluminum. Alternatively, the face sheet 30 may be constructed of wire mesh. The back plate 33 may be constructed from a solid, substantially rigid sheet of metal or composite material. A surface 36 of the back plate 33 that is immediately adjacent to the liner core 32 may be optionally bonded to or coated with a polymeric material, as indicated by shading in FIG. 3. This optional construction may add compliance to the back plate 33, and could be used to fine-tune the acoustic performance of the acoustic panel liner 20. Suitable example polymers may include natural or synthetic rubber, as well as nylon, neoprene, silicone, polypropylene, etc. The particular polymeric material may be selected to provide the desired compliance and sound-absorption.

The face sheet 30 defines an array of holes 31, which pass through the thickness of the face sheet 30. When installed inside of the engine nacelle 18 of FIG. 2, the face sheet 30 is arranged to face the source of noise, for instance by continuously circumscribing the axis of rotation 11 as shown in FIG. 2. The rigid back plate 33 is then bonded, welded, riveted, or otherwise securely attached to the surface 22 within the engine nacelle 18 as shown in FIG. 2.

In one possible configuration, each of the holes 31 in the face sheet 30 may have the same diameter, with the holes 31 arranged linearly with respect to each other, for instance in parallel columns and rows as shown. The actual distribution pattern and diameters of the holes 31 may vary with the intended application, with the pattern and size of the holes 31 contributing to the overall sound absorbing functionality of the acoustic panel liner 20. Likewise, different sound-absorbing materials such as composites of metal and rubber may be used in lieu of aluminum to the same ends.

The liner core 32 of FIG. 3 includes a plurality of elongated acoustic chambers 34, which are shown here in an example embodiment as multiple adjacent honeycomb-shaped cells, i.e., elongated hexagons. Other open-ended cell shapes may be used without departing from the intended scope, including any other open-ended polygon, circle, or rectangle. Each elongated acoustic chamber 34 may have a width of about $3/8$" to $1/2$" in a typical embodiment, although other sizes may be envisioned without departing from the intended scope of the present invention. The thicknesses of the liner core 32, the face sheet 30, and the back plate 33, as well as the geometric parameters of the holes 31 in the face sheet 30, all contribute to the desired broadband sound absorption of the acoustic panel liner 20 of FIG. 3, and thus can be configured as needed for an intended application.

One or more septum may be disposed within one or more of the elongated acoustic chambers 34. Examples of the septum include a membrane or a mesh cap of metal, plastic, composite material, or other suitable material that provides a desired DC flow resistance. The septum can be constructed of various materials that provide the desired DC flow resistance. The use of embedded septa 40 effectively divides an elongated acoustic chamber 34 into multiple layers, such as a layer having a depth D1 between the septum 40 and the face sheet 30 and another layer of depth D2 between the septum 40 and the back plate 33.

The insertion depths D1 and D2 may be different. As used herein, the term "different" means any variation in depths D1 and D2, and possibly additional depths, that is sufficient for producing at least a 10 Hz difference in resonant frequency, $f_R$. The portion of impedance affected by the insertion depth of a corresponding elongated acoustic chamber 34 changes linearly with the insertion depth.

The resonant frequency $$f_R = \frac{c}{\lambda},$$

where c is the speed of sound and λ is the wavelength of the acoustic signal at the resonant frequency $f_R$. Resonance of the elongated acoustic chamber 34 occurs when a depth (D) of the elongated acoustic chamber 34 is equal to $$\frac{\lambda}{4}$$

or the resonant frequency $f_R$. Thus, resonance occurs when $f_R$=c/4D. As the insertion depth D increases, the resonant frequency, $f_R$, decreases. Therefore, insertion depths D, i.e., the depths D1 and D2 shown in the example embodiment of FIG. 3, can be selected and varied to provide the desired response. In a possible embodiment, depths D1 and D2 may be varied by at least 0.1" to 0.2" increments, for instance with D1=1.0" and D2=1.1" or 1.2". Another variation may be as little as 0.005". Smaller increments may be possible in time given sufficient advances in manufacturing capabilities. When realized, such smaller variances could be used within the scope of the invention. An example depth of 1.000" may have a resonant frequency of about 3376 Hz, while a depth of 1.005", without otherwise varying the construction of the septum 40 used to establish that depth, can correspond to a resonant frequency of about 3359 Hz, for a difference of 17 Hz. Slight depth variation can therefore be used to fine tune the acoustic performance.

In an example embodiment, the septa 40 are all configured as mesh caps of fine wire, woven materials or other suitable material, each of which is inserted into an opening 38 defined by a corresponding one of the elongated acoustic chambers 34. Once inserted into one of the elongated acoustic chambers 34, each septum 40 is bonded to an inner wall 35 at the depth D1 with respect to the face sheet 30, with a bonding material that has a suitable viscosity, i.e., a viscosity with minimal wicking along the walls of the elongated acoustic chambers 34. An alternative embodiment which randomly varies the embedded depths of the septa 40 is described below with reference to FIG. 4.

The acoustic panel liner 20 as shown in FIG. 3 forms a two-layer, constant depth liner design with two dominant resonant frequencies. The first dominant resonant frequency is at or near the frequency for which the dimension of the liner core 32 above the septum 40, i.e., depth D1, is equal to a quarter-wavelength on an incident sound wave emitted by the engine assembly 16 of FIG. 2. The second dominant resonant frequency is at or near the frequency for which a remaining depth D2 of the liner core 32 below the level of the embedded septum 40 is equivalent to the quarter-wavelength, where D1+D2 is equal to a total depth D of the elongated chamber 34. The DC flow resistance of the septa 40 may be selected and varied in a particular pattern, as indicated schematically by the different patterns of the septa 40, such that some of the septa 40 have a higher DC flow resistance than the remaining septa 40.

If the depth D1 is selected appropriately, the acoustic panel liner 20 of FIG. 3 will provide enhanced sound absorption for incident frequencies near the resonant frequencies, while also providing a reasonable amount of sound absorption at frequencies between these resonant frequencies. In a possible embodiment, at least one of the septum 40 may have a high DC flow resistance, with "high" defined herein as at least about 2000 MKS Rayls. Alternatively, a high DC flow resistance septum could be at least about 4000 MKS Rayl, or at least about at least 40000 MKS Rayl. One or more high DC flow resistance septa may be used with septa 40 having lower DC flow resistances, e.g., from about 40 to about 2000 MKS Rayls, within the same or different elongated acoustic chambers 34. Preferably, if multiple septa 40 are used within the same elongated acoustic chamber 34, the septum 40 with the lower DC flow resistance will be disposed above the septum 40 with the higher DC flow resistance (e.g. the lower DC flow resistance septum 40 will be closer to the face sheet 30). However, there may be embodiments where the higher DC flow resistance septum 40 may be positioned below a lower DC flow resistance septum 40 (e.g. the lower DC flow resistance septum 40 will be closer to the back plate 33).

Figure 4:
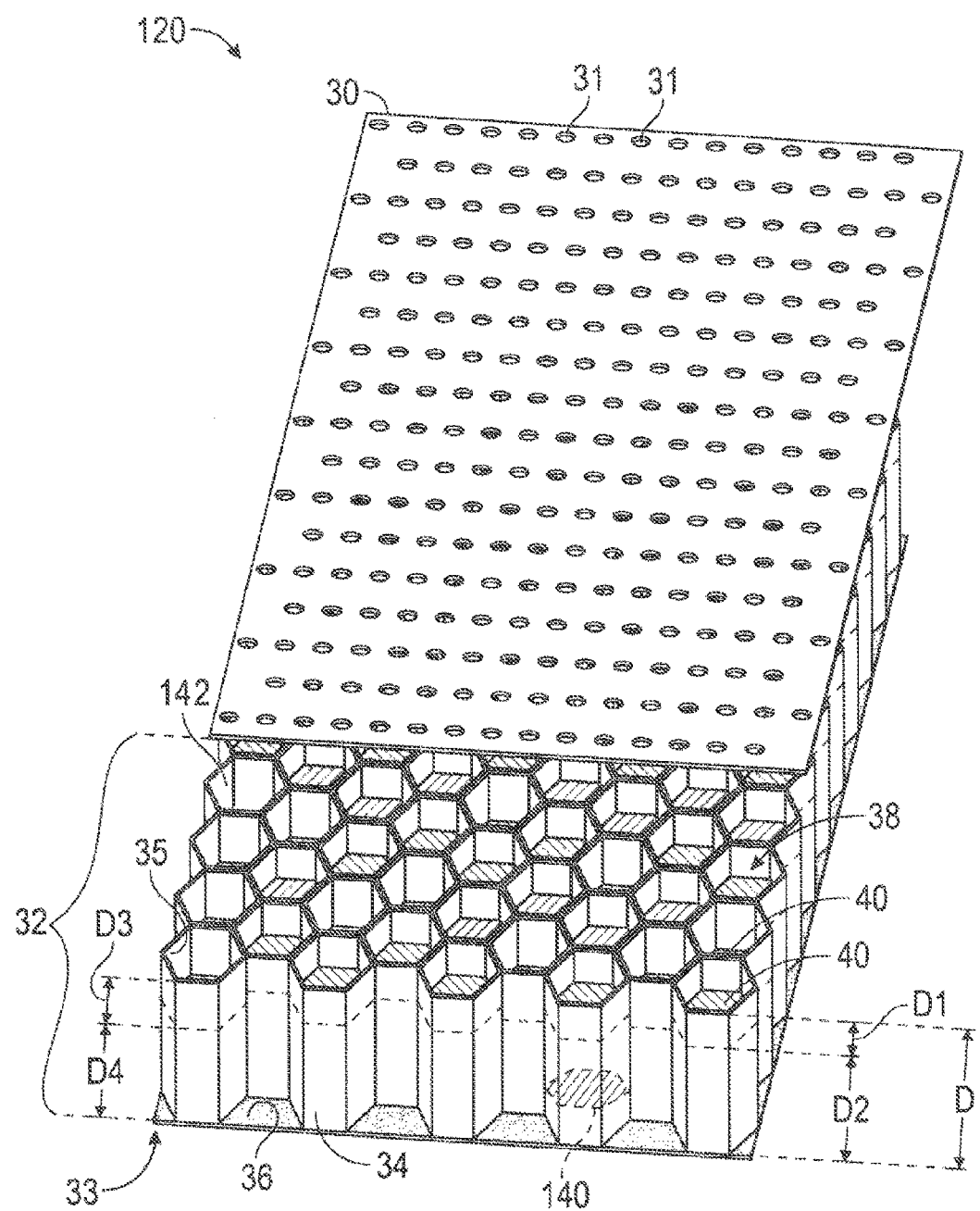
FIG. 4 is a schematic perspective partially-exploded view of an embodiment of an acoustic panel liner.

Referring to FIG. 4, in another embodiment, the insertion depths of the septa 40 may be varied to form an alternative acoustic panel liner 120. The DC flow resistances of the septa 40 may be the same, or they may be varied. If varied, some of the septa 40 may be optionally provided with a high DC flow resistance. The insertion depths are shown as depths D1 and D3 for a simplified two-depth design. More than two different depths may be used in other embodiments. The distribution pattern of the depths D1 and D3 may be randomized through the acoustic panel liner 120.

In the simplified two-depth design of FIG. 4, D1+D2=D as in FIG. 3, while D3+D4=D for any elongated acoustic chambers 34 having a deeper insertion depth D3. If the insertion depths are varied as shown, each elongated chamber 34 performs as an independent dual-resonance system. If the DC flow resistance of a septum 40 is sufficiently high to inhibit sound transmission through the septum 40, the acoustic performance of the elongated acoustic chamber 34 becomes equivalent to a single-layer acoustic panel liner, i.e., it has only one fundamental resonance and therefore behaves as a narrow-band absorber of sound.

The construction of FIG. 4 thus embeds septa 40 at different depths throughout the liner core 32, but also configures some but fewer than all of the septa 40 with a high DC flow resistance of at least 2000 MKS Rayls, or at least 4000 MKS Rayls in another embodiment, or at least 40000 MKS Rayls in another embodiment, so as to further inhibit sound transmission. This allows some elongated acoustic chambers 34 to behave acoustically as if they have one layer/one depth, e.g., depths D1 or D3, while other elongated acoustic chambers 34 behave as if they have two layers. The above description is directed toward the use of two-layer configurations. However, nothing precludes the use of additional septa 40, and thus of additional effective layers.

That is, space permitting, additional layers may be formed via insertion of additional septa 40 into each elongated acoustic chamber 34 so as to further improve or fine tune impedance control. Therefore, a liner core 32 may be formed with more than one septum 40 in some or all of the elongated chambers 34, with a portion of the total number of elongated chambers 34 optionally having septa 40 with high DC flow resistances as noted above. This possible alternative embodiment is illustrated via septum 140 in FIG. 4.

Another possible alternative is to have at least one or more elongated acoustic chambers 142 that do not contain any septa, as shown in FIG. 4, in order to achieve the desired level of sound reduction.

In order to form the acoustic panel liners 20 and 120 of FIGS. 3 and 4, one may provide the liner core 32 with a plurality of the elongated acoustic chambers 34, and then positioning a septum 40 having a first DC flow resistance, e.g., less than 2000 MKS Rayls, within a first number of the elongated chambers 34. Additionally, one may then position septa 40 having a second higher DC flow resistance, e.g., 2000-40000 MKS Rayls or more, within a second number of the elongated chambers 34. Or, all septa 40 may have DC flow resistances of less than 2000 MKS Rayls, with the same or different DC flow resistances. The depths of the insertion may be the same (FIG. 3) or different (FIG. 4) in two possible configurations. The liner core 20 or 120 may be positioned between the face sheet 30 and the back plate 33. Connection of the liner core 32 to the face sheet 30 and the back plate 33 forms the acoustic panel liner 20 and 120 of FIGS. 3 and 4, respectively. The acoustic panel liners 20 and 120 can thereafter be attached to the engine nacelle 18 of FIG. 2, such as by attaching the back plate 33 of FIGS. 3 and 4 to surface 22 of the body 27 of the engine nacelle 18 shown in FIG. 2.

While the best modes for carrying out the invention have been described in detail, those familiar with the art to which this invention relates will recognize various alternative designs and embodiments for practicing the invention within the scope of the appended claims.

The invention claimed is:

1. An acoustic panel liner, the acoustic panel liner comprising:
    a face sheet;
    a back plate configured to attach to an internal surface; and
    a liner core disposed between the face sheet and the back plate, said liner core comprising:
        a first and second elongated chamber extending between said face sheet and said back plate, and
        a first and second septum, wherein said first septum has a first DC flow resistance and is disposed within said first elongated chamber at a first insertion depth, and said second septum has a second DC flow resistance and is disposed within said second elongated chamber at a second insertion depth, wherein said first DC flow resistance is from about 40 to about 1,200 MKS Rayls and said second DC flow resistance is at least about 2,000 MKS Rayls.

2. The acoustic panel liner of claim 1, wherein said second DC flow resistance is at least about 4,000 MKS Rayls.

3. The acoustic panel liner of claim 1, wherein said second DC flow resistance is at least about 40,000 MKS Rayls.

4. The acoustic panel liner of claim 1, wherein said first insertion depth and said second insertion depth are substantially equal.

5. The acoustic panel liner of claim 1, wherein said first insertion depth and said second insertion depth are different.

6. The acoustic panel liner of claim 5, wherein said acoustic panel liner is disposed in an engine nacelle, and said first and second insertion depths are varied from each other by at least 0.005".

7. The acoustic panel liner of claim 1, wherein said liner core comprises a third septum disposed in said first elongated chamber at a third insertion depth, wherein said septum has a third DC flow resistance from about 40 to about 1,200 MKS Rayls.

8. The acoustic panel liner of claim 1, wherein said liner core comprises a third septum disposed in said second elongated chamber at a third insertion depth, wherein said third septum has a third DC flow resistance from about 40 to about 1,200 MKS Rayls, and wherein said third insertion depth is less than said second insertion depth.

9. The acoustic panel liner of claim 1, wherein said first and second elongated acoustic chambers have a polygonal cross-sectional shape.

10. The acoustic panel liner of claim 1, wherein said first and second septum comprise a mesh cap that is bonded to an inner wall of a corresponding one of said first and second elongated acoustic chambers.

11. The acoustic panel liner of claim 1, wherein said first and second septum comprise a perforated metal plate.

12. An engine assembly comprising:
an engine nacelle having a body; and
an acoustic panel liner including:
- a back plate connected to an internal surface of said body;
- a face sheet; and
- a liner core positioned between said back plate and said face sheet, and having a plurality of elongated acoustic chambers each containing a septum having a DC flow resistance;

wherein at least one septum has a DC flow resistance of about 40 to about 1,200 MKS Rayls and at least one septum has a DC flow resistance of at least about 2,000 MKS Rayls.

13. The engine assembly of claim 12, wherein said septum are disposed within said elongated acoustic chambers at various depths.

14. The engine assembly of claim 12, wherein each of the plurality of elongated chambers has a hexagonal cross-sectional shape.

15. The engine assembly of claim 12, further comprising an engine that is surrounded by the engine nacelle.

16. The engine assembly of claim 12, wherein at least one septum has a DC flow resistance of at least about 40,000 MKS Rayls.

17. The engine assembly of claim 12, wherein the back plate is constructed at least partially of a polymeric material.

18. An acoustic panel liner for an engine nacelle, the acoustic panel liner comprising:
- a face sheet;
- a back plate configured to attach to an internal surface of the engine nacelle; and
- a liner core disposed between the face sheet and the back plate, said liner core comprising a first and second elongated acoustic chamber and a first septum, wherein said first septum has a first DC flow resistance and is disposed within said first elongated acoustic chamber at a first insertion depth, wherein said DC flow resistance comprises at least about 2,000 MKS Rayls, and where said second elongated acoustic chamber does not contain a septum.

19. The acoustic panel liner of claim 18, the liner core further comprising a third elongated acoustic chamber and a second septum disposed within said third elongated acoustic chamber, said second septum having a second DC flow resistance comprising less than about 1,200 MKS Rayls.

20. The acoustic panel liner of claim 18, wherein said first DC flow resistance comprises at least about 40,000 MKS Rayls.

* * * * *